United States Patent [19]
Grix

[11] 4,026,685
[45] May 31, 1977

[54] FLOW REVERSING REGENERATIVE AIR DRYER

[75] Inventor: Arthur R. Grix, St. Louis County, Mo.

[73] Assignee: Wagner Electric Corporation, Parsippany, N.J.

[22] Filed: Dec. 16, 1975

[21] Appl. No.: 641,248

[52] U.S. Cl. .................... 55/213; 55/218; 55/267; 55/302; 55/283; 55/316; 55/337; 137/204

[51] Int. Cl.² ........................ B01D 46/00

[58] Field of Search ............ 55/212, 213, 215, 216, 55/218, 267–269, 316, 303, 302, 59, 62, 163, 387, 388, 389, DIG. 17, 283, 337; 137/204

[56] References Cited
UNITED STATES PATENTS

| | | | |
|---|---|---|---|
| 2,641,364 | 6/1953 | De pallens | 55/302 |
| 3,080,693 | 3/1963 | Glass et al. | 55/62 |
| 3,796,025 | 3/1974 | Kasten | 55/316 |
| 3,832,831 | 9/1974 | Ritchie | 55/218 |
| 3,934,990 | 1/1976 | Ide | 55/269 |

FOREIGN PATENTS OR APPLICATIONS

| | | | |
|---|---|---|---|
| 1,395,788 | 5/1975 | United Kingdom | 55/387 |

*Primary Examiner*—Bernard Nozick
*Attorney, Agent, or Firm*—Eyre, Mann, Lucas & Just

[57] ABSTRACT

A flow-reversing, regenerative, desiccant air dryer system absorbs moisture, oil droplets, and carbon particles from the incoming air during compression in a compressed air system. Once sufficient air pressure has been attained in an air pressure reservoir, control valves direct the flow of atmospheric-pressure air, heated by passing through the warm compressor cylinder, in a reverse direction through the air dryer. The reverse flow of heated, atmospheric pressure air both purges the trapped oil, carbon particles, and condensed liquid water and removes the moisture from the desiccant.

5 Claims, 4 Drawing Figures

FLOW REVERSING REGENERATIVE AIR DRYER

BACKGROUND OF THE INVENTION

A system that compresses air compresses all of the gases and vapors that exist in the air that enter the system. Immediately following the compression function the gases and vapors are still in their gaseous state as a result of the high temperatures from the almost adiabatic compression process. However, due to the subsequent transfer of the heat of compression to the outside air, the temperature of the compressed air in the system rapidly approaches ambient air temperature. Water vapor, one of the constituents of air, undergoes a phase transformation at a temperature between the compression temperature and ambient air temperature. The air in the system becomes saturated with water vapor and liquid water condenses.

Water in the liquid state has a detrimental affect on air compressor system. Water washes away lubricants and, when the ambient temperature drops below the freezing point, water freezes in the system causing equipment stoppage, possible malfunction and danger.

Desiccant air dryers have been used to remove liquid water and water vapor from compressed air systems. Desiccant materials, however, eventually become saturated and stop absorbing water vapor. Several methods have been employed to regenerate saturated desiccants so that they may be reused. In one method, the system is shut down while water-saturated desiccant is removed and dried by heating. In other systems, two desiccant containers are alternately on-line between the compressor and the pressure reservoir. Each desiccant container is provided with a heating source. The desiccant container which is off-line at any particular time is opened to the atmosphere and heated to drive off the trapped moisture. Refinements of this method use a small amount of the dried outflow from the on-line cylinder to help dry the desiccant in the off-line cylinder.

Although the preceding methods are known to work, they are inconvenient and costly to install and to operate. In addition, they make inadequate provision for disposing of oil particles and burned carbon particles which normally pass from the compressor in the air stream. The oil particles, if not removed, poison the desiccant material.

SUMMARY OF THE INVENTION

During the compression cycle, the present invention directs the flow of compressed, water-saturated air, also containing oil droplets and carbon particles into a sealed air dryer. Within the air dryer, the air flows in a spiral laminar sheet between an outer heat-exchanger surface and an inner cylindrical cartridge. The cylindrical cartridge has a perforated plate at each of its ends. A layer of fibrous filter material inside the perforated plate at each end excludes oil droplets and carbon particles. Adsorbent desiccant material fills the cylindrical container between the two fibrous filters. The air passes through the bottom perforated plate into the bottom of the cylindrical desiccant cartridge, depositing its contained oil droplets and carbon particles in the fibrous filter and giving up its water to the desiccant. The dried air flows out the top of the sealed container, through a unidirectional valve into a pressure reservoir.

When the pressure in the pressure reservoir attains a predetermined threshold level, control valves redirect the flow of air from the compressor to begin the drying cycle. A purge valve in the bottom of the dryer is fully opened to the atmosphere. The pressure stored in the dryer and in the lines upstream of the unidirectional valve is explosively vented through the purge valve to the atmosphere carrying with it the liquid condensed water from a sump in the bottom of the container and the trapped oil droplets and carbon particles from the bottom fibrous filter. The compressor outflow line is switched to a top fitting adjacent to the outlet fitting which normally feeds the pressure reservoir during compression. The compressor begins to pump atmospheric-pressure air in the reverse direction downward through the top perforated plate of the desiccant container, through the desiccant and through the purge valve to the atmosphere. The fibrous filter in the top of the dessicant container traps oil droplets and carbon particles during this operation. The compressor body becomes heated during the compression cycle. The atmospheric pressure air is heated in its passage through the compressor on its way to passing through the desiccant material. The heated, atmospheric pressure air carries off the moisture trapped in the desiccant material, preparing it for the next compression cycle.

DETAILED DESCRIPTION OF THE PREFERRED EMBODIMENT

Figure 1:
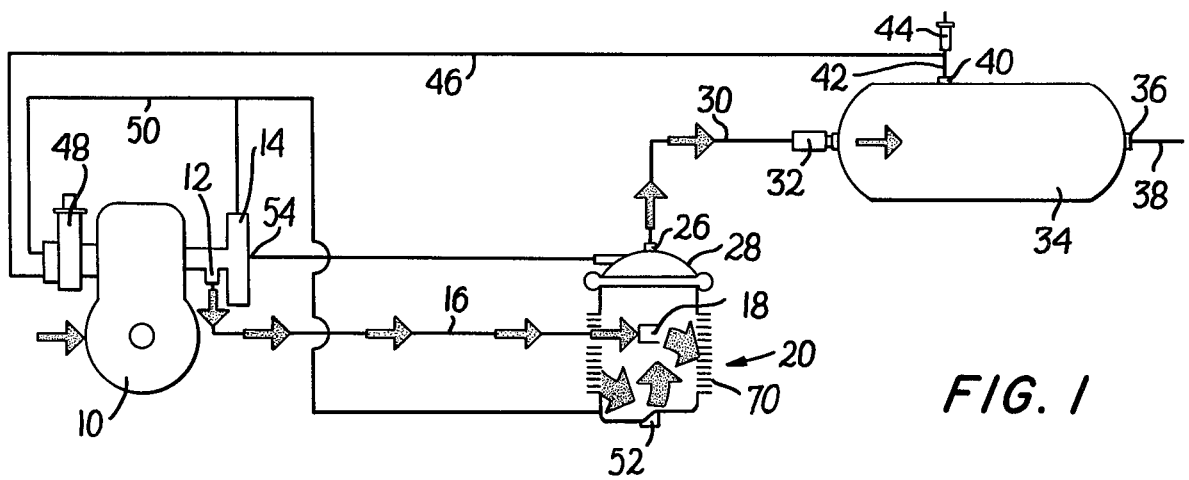
FIG. 1 shows a schematic diagram of an air compressor system illustrating an embodiment of this invention during the compression cycle.

The following description, written with reference to FIG. 1, details the operation of the system during the compression cycle. The compressor 10 provides pressurized air through the compression outlet 12 of an unloader valve 14. The heated compressed air flows, as indicated by the arrows, along a pressure pipe 16, into a pressure inlet 18 in the sealed pressure vessel 20. As shown by the arrows, the incoming air spirals downward in a sheet around the inside of the pressure vessel 20. The exterior of the pressure vessel 20 may be fitted with convection-cooling fins 70 to improve the transfer of heat from the sheet of heated compressed air to the ambient air. As the compressed air gives up heat, moisture condenses on the inner surface of the pressure vessel and collects in a sump (24 see FIG. 3) at the bottom of the pressure vessel 20. The cooled air, still saturated with water vapor and containing other contaminants, begins to travel upward toward the center outlet 26 in the pressure cap 28 of the pressure vessel 20. The manner of filtering and drying the air will be described later.

The dry air emerging from the top of the pressure vessel 20 is carried by a discharge line 30, through a unidirectional valve 32, and into an air pressure reservoir 34. An air pressure reservoir outlet 36 feeds compressed air through a demand line 38 to the using equipment. A pressure relief fitting 40 and pressure relief line 42 feed a sample of the pressure in the reservoir 34 to a pressure relief valve 44. A pressure sensing line 46 feeds a sample of the pressure in the pressure relief line 42 to a pressure governor 48. When the pressure reaches a predetermined value, the pressure governor 48 connects a pressure control signal on control line 50 to the unloader valve 14 and to a purge valve 52 located at the bottom of the pressure vessel 20. The control signal opens purge valve 52 providing direct access to the atmosphere from the bottom of the pressure vessel 20. This allows trapped liquid water, oil droplets and burned carbon particles to exhaust into the atmosphere. This venting process is aided by the discharge of pressure from the pressure vessel 20 pressure pipe 16, and the portion of the discharge line 30 upstream of the unidirectional valve 32. The unidirectional valve 32 prevents discharge of the pressure stored in the reservoir 34.

Figure 2:
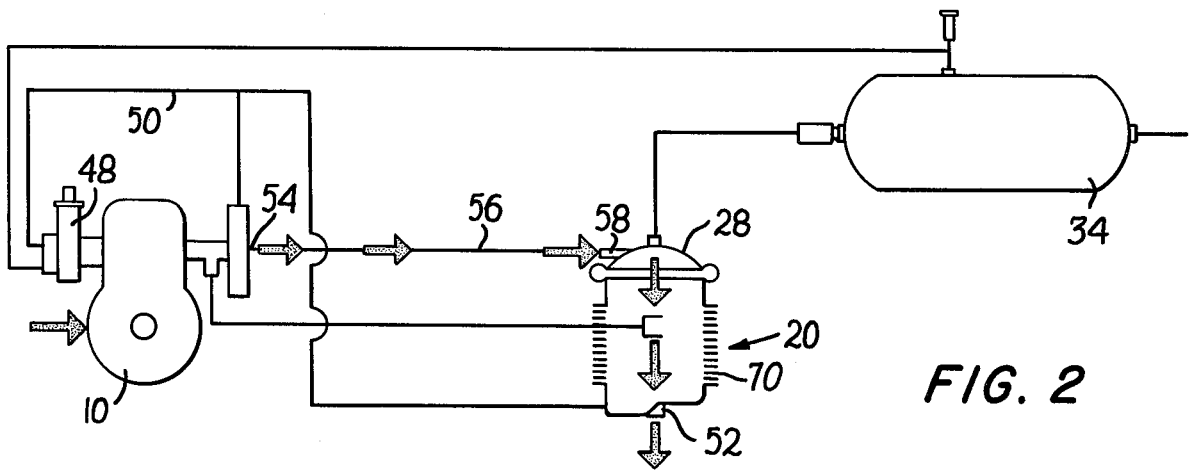
FIG. 2 shows a schematic of the same air compressor system during purging according to the teachings of this invention.

The control signal also causes the unloader valve 14 to close compression outlet 12 and connect purge outlet 54 to the compressor 10 output. This change in valve conditions sets up the flow during purge shown in FIG. 2. The compressor 10 continues to run during the purge operation. Air is pumped through purge line 56 into a purge fitting 58 in the pressure cap 28. As indicated by the arrows, purge air, at approximately atmospheric pressure, flows downward through the pressure vessel 20 and out the purge valve 52 at the bottom. The drying process is aided by the fact that the compressor 10, heated during the compression part of the cycle, contributes heat to the incoming air stream.

When the air pressure in the reservoir 34 decreases to a predetermined value, the pressure governor 48, sensing this condition removes the pressure control signal from the control line 50. This change causes the unloader valve 14 and the purge valve 52 to resume their conditions for a new compression cycle as described in connection with FIG. 1. The system continues to alternate between compression and purge cycles.

Figure 3:
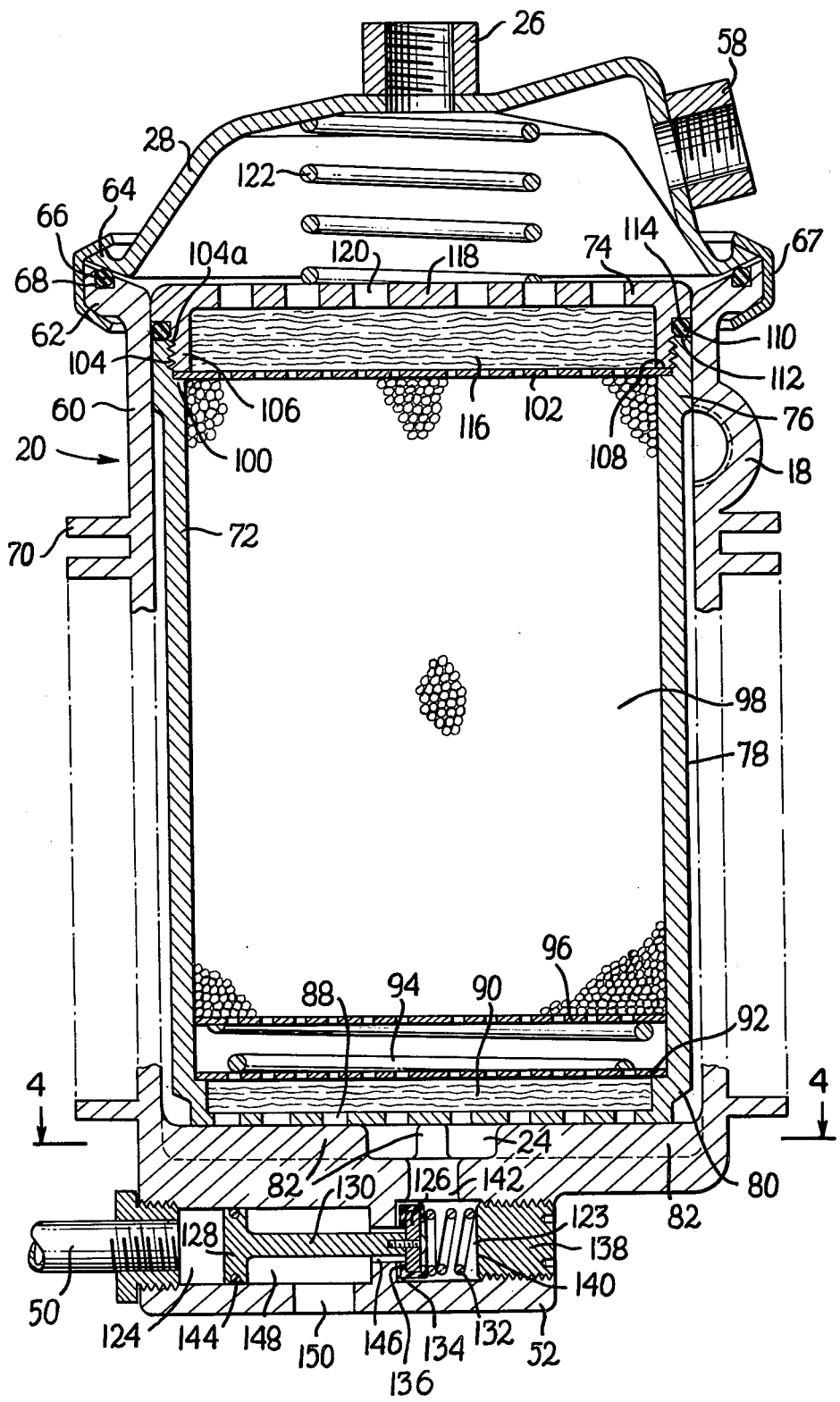
FIG. 3 shows a cross-sectional view of the dryer.

Referring now to the detailed cross-sectional drawing of the pressure vessel 20 shown in FIG. 3, the pressure vessel 20 consists of a lower shell 60 and a pressure cap 28. An outward-directed flange 62 at the upper end of the lower shell 60 mates with a cooperating outward flange 64 on the lower end of the pressure cap 28. A resilient gasket 66, fitting in an annular groove 68 in the flange 62 provides a pressure-tight seal between the lower shell 60 and the pressure cap 28. A retaining ring 67, of a type well known in the art, clamps the two flanges 62, 64 together. At least a portion of the lower shell 60 is preferably provided with convection-cooling fins 70 on its outer surface. The pressure inlet 18 is located on the upper side of the lower shell 60. The axis of the pressure inlet 18 is tangential to the lower shell 60. Thus entering air is directed in a counter-clockwise spiral (as seen from above) about the inside of the lower shell 60.

Figure 4:
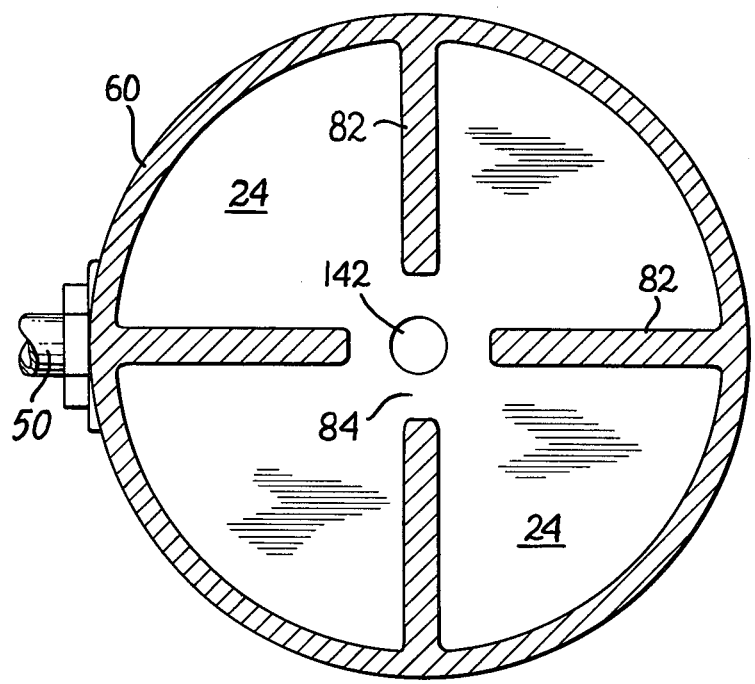
FIG. 4 shows a cross-sectional view of the dryer along 4—4 in FIG. 3.

A desiccant container, consisting of a lower part 72 and a cap 74 is fitted inside the lower shell 60. An annular enlargement 76 at the top of the lower portion 72 fits snugly within the lower shell 60. Below the annular enlargement 76, the slightly narrower profile of the lower part 72 leaves an annular cylindrical air space 78. The bottom of the desiccant container 80 rests on four support bars 82. Referring momentarily to the cross-sectional view in FIG. 4, the four support bars 82 are arranged in an x with a central opening 84. The space between the bars 82 plus the central opening 84 define a sump 24 into which condensed liquid water and oil droplets may drain.

Returning now to FIG. 3, the bottom of the desiccant container 80 is perforated with a plurality of openings 88. Inside the bottom 80, a lower fibrous filter 90 is situated between the bottom 80 and a perforated retainer plate 92. A conical spiral spring 94 applies axial pressure between the perforated retainer plate 92 and a lower perforated desiccant retainer plate 96. The openings in the lower perforated desiccant retainer plate 96 are smaller than the desiccant particles. The central region of the desiccant container 98 contains granular adsorbent desiccant material.

At its upper end, the inner diameter of the lower part 72 of the desiccant container is increased. The annular ridge 100 thus formed provides a mounting surface for an upper perforated desiccant retainer plate 102. The inside of the increased inner diameter contains inside threads 104. Mating outside threads 104a on the lip 106 of the cap 74 secures together the cap 74 and the lower part 72 of the desiccant container. The inner shoulder of the lip 108 presses the upper desiccant retainer plate 102 against the annular ridge 100. A resilient O-ring 110 is compressed between the upper lip of the lower part 112 and a cooperating lip on the cap 114. As the cap 74 is screwed into the lower part 72, the O-ring 110 is compressed between the surfaces. This not only provides an air- and moisture-tight seal between the cap 74 and lower part 72 of the desiccant container, but also causes the O-ring 110 to protrude outward whereby an air- and moisture-tight seal is also produced between the desiccant container and the lower shell 60 of the pressure vessel 20. This latter seal ensures that the only possible communication between the lower part of the pressure vessel 20 and the pressure cap 28 must be accomplished through the desiccant container. An upper fibrous filter 116 occupies the space between the upper desiccant retainer plate 102 and the top of the cap 118. The top of the cap 118 is pierced with a plurality of openings 120 to enable the passage of air.

A helical spring 122 applies axial pressure between the pressure cap 28 and the cap 74 of the desiccant container to retain the desiccant container in position against the upward force of the incoming air.

The purge valve 52 shown at the bottom of the lower shell contains a purge cylinder 123 and a control cylinder 124. A purge piston 126 and a control piston 128 are mechanically connected together by an axial rod 130. A helical return spring 132 of negligible force urges the purge piston 126 against its seat 134. Resilient material 136 on the mating face of the purge piston 126 provides an air- and moisture-tight seal when the purge piston 126 is in its closed position as shown. A threaded plug 138 seals the outer end of the purge cylinder 123 and provides a bearing surface 140 against which the helical return spring 132 presses. A drain hole 142 provides drainage for water and other contaminants between the sump 24 and the purge cylinder 123.

A resilient annular control-piston gasket 144 provides an air-tight seal between the control piston 128 and the control cylinder 124.

The hole 146 in the seat 134 of the purge cylinder 123 is considerably larger in diameter than the axial rod 130 which passes through it. Thus, when the purge valve 52 is opened there is adequate space for air and contaminants to pass from the purge cylinder 123, through the hole 146, into an outer chamber 148 and thence through an exhaust port 150 to the atmosphere.

OPERATION

During compression, heated, compressed, moisture-laden air, also containing oil droplets and burned carbon particles enters the pressure container 20 tangentially through pressure inlet 18. Prevented from going upward by the seal provided by the resilient O-ring 110, the incoming air is forced to spiral downward in a sheet between the inner surface of the lower shell 60 of the pressure vessel 20 and the outer surface of the lower part 72 of the desiccant container. In its travel toward the bottom, the air gives up much of its heat of compression to the walls of the lower shell 60 which are kept cool by the convection-cooling fins 70. As it gives up its heat, the air becomes saturated with moisture and deposits the excess moisture on the inner surface of the lower shell 60. This moisture drains into the sump 24. When it reaches the bottom, the cooled but still water-saturated air enters the desiccant container through the openings 88 in the bottom. The lower fibrous filter 90 removes oil droplets and carbon particles from the air stream. The air thereupon passes upward through the openings in the perforated retainer plate 92 and the lower perforated desiccant retainer plate 96 and into the desiccant material in the central region 98. As it passes through the desiccant material the air gives up its water vapor to the desiccant. The dried air then passes through the openings in the upper desiccant retainer plate 102, the upper fibrous filter 116, and cap 74 into the pressure cap 28. The dried compressed air passes through the center outlet 26 to the reservoir. The purge fitting 58 is blocked by the unloader valve 14 (see FIG. 1) at this time.

When a preset value of air pressure is attained in the reservoir, a positive control pressure is connected through the control pipe 50 to the control cylinder 124. The positive control pressure in the control cylinder 124 forces the control piston 128 toward the right. The purge piston 126 is moved out of engagement with its seat 134. The pressure stored in the pressure vessel 20 is explosively vented through the exhaust port 150 carrying with it all water and oil trapped in the sump 24. In addition, the explosive release of pressure tends to expel oil and carbon particles trapped in the lower fibrous filter 90.

The compressor output at this time is connected to the purge fitting 58; the center outlet 26 and the pressure inlet 18 being blocked. Heated, atmospheric-pressure air is pumped from the compressor through the purge fitting 58 and the desiccant in the central region of the desiccant container 98, thence out the purge valve 52 to the atmosphere. The flow of atmospheric-pressure air carries off the trapped moisture, drying the desiccant in preparation for the next compression cycle.

At the end of the purge cycle, the positive control pressure through the control pipe 50 is released. The helical return spring 132 urges the purge piston 126 into engagement with its seal 134. The purge fitting 58 again becomes blocked, and the compressor air flow is again directed into the pressure inlet 18. A new compression cycle is initiated as previously described.

What is claimed is:

1. In an air compressor system of the type wherein an air compressor delivers compressed air through an air dryer to an air pressure reservoir, the reversible-flow regenerative drying system which comprises:
    a. a pressure container;
    b. said pressure container having a compressed air inlet, a compressed air outlet, a purge air inlet and a purge air outlet;
    c. an inner container having sorbent material therein within said pressure container, said inner container being substantially coaxial to and spaced from said pressure container whereby an air space is provided therebetween;
    d. means for sealing one end of said inner container to said pressure container intermediate said compressed air inlet and outlet;
    e. the ends of said inner container having means for allowing the passage of air therethrough;
    f. the purge air inlet adjacent to said compressed outlet;
    g. said purge air outlet being at the end remote from said purge air inlet whereby purge air is enabled to flow through said sorbent material in a direction the reverse of the flow of the compressed air; h. valve means for opening said purge air outlet; and
    i. a unidirectional valve interposed between said compressed air outlet and said air pressure reservoir.

2. A drying system as recited in claim 1 wherein said sorbent material further comprises:
    a. first fibrous filter means on the upstream side of said inner container adapted to removing oil droplets and solid contaminant particles from said compressed air stream;
    b. a container of desiccant material located in said inner container downstream from said first fibrous filter means, said desiccant material being adapted to sorption of water vapor from said air stream; and
    c. second fibrous filter means on the outlet side of said inner container downstream from said desiccant material, said second fibrous filter means being adapted to removing oil droplets and solid contaminants from the purging air stream before it reaches said desiccant material.

3. A drying system as recited in claim 1 further comprising:
    a. means for sensing the pressure in said air pressure reservoir;
    b. a pressure governor adapted to producing a control pressure signal when said sensed pressure exceeds a first level and further adapted to removing said control pressure signal when the sensed pressure drops to a second, lower pressure level; and
    c. said valve means being adapted to connecting the stream of air from said compressor to said compressed air inlet through said absorbing means and thence through said compressed air outlet into said pressure reservoir during the absence of said control pressure signal and further adapted to connecting the stream of air from said compressor to said purge air inlet and opening said purge air outlet during the presence of said control pressure signal.

4. In a compressed air system of the type wherein an air compressor delivers compressed air through an air dryer to an air pressure reservoir, the reversible-flow regenerative dryer comprising:
    a. inner and outer containers;
    b. annular sealing means between said inner and outer containers;
    c. air passage means below said sealing means between said inner and outer containers;

d. heat exchanger means defining the exterior surface of said outer container adjacent to said air passage means;
e. tangential air inlet means adapted to directing the flow of incoming air in a tangential direction into said air passage means;
f. a sump at the bottom of said outer container in which liquid water, which has been condensed from the air stream, may collect during air compression;
g. first and second fibrous filters inside perforated upper and lower ends respectively of said inner container;
h. desiccant material filling at least a portion of the volume of said inner container between said first and second fibrous filters;
i. a compressed air outlet and a purge air inlet in the top of said outer container above said sealing means;
j. a purge valve below said sump, said purge valve being adapted to venting air, liquid water, particulates, oil, and water vapor from the inside of said outer container to the atmosphere when opened;
k. a control valve, mechanically connected to said purge valve, said control valve being adapted to opening said purge valve upon receipt therein of a pressure control signal;
l. valve means for disconnecting the compressed air from said air compressor to said tangential air inlet and connecting it to said purge air inlet and opening said purge valve upon the attainment of a predetermined air pressure in said air pressure reservoir; and
m. a unidirectional valve between said compressed air outlet and said air pressure reservoir.

5. A drying system as recited in claim 1 further comprising:
a. the axis of said compressed air inlet being substantially tangential to said air space; and
b. said compressed air inlet being on the side of said means for sealing remote from said compressed air outlet whereby said compressed air injected into said air space travels in a spiral path along a substantial length of said air space.

* * * * *

UNITED STATES PATENT OFFICE
CERTIFICATE OF CORRECTION

PATENT NO. : 4,026,685
DATED : May 31, 1977
INVENTOR(S) : Arthur R. Grix

It is certified that error appears in the above-identified patent and that said Letters Patent are hereby corrected as shown below:

Column 6, line 19, after the semi-colon (;), delete -- h. --; line 20, before "valve" insert -- h. --.

Signed and Sealed this thirtieth Day of August 1977

[SEAL]

Attest:

RUTH C. MASON
Attesting Officer

C. MARSHALL DANN
Commissioner of Patents and Trademarks